May 8, 1951         F. W. BENEDICT         2,552,305
PRESSURE FILTER
Filed May 13, 1947                                2 Sheets-Sheet 1
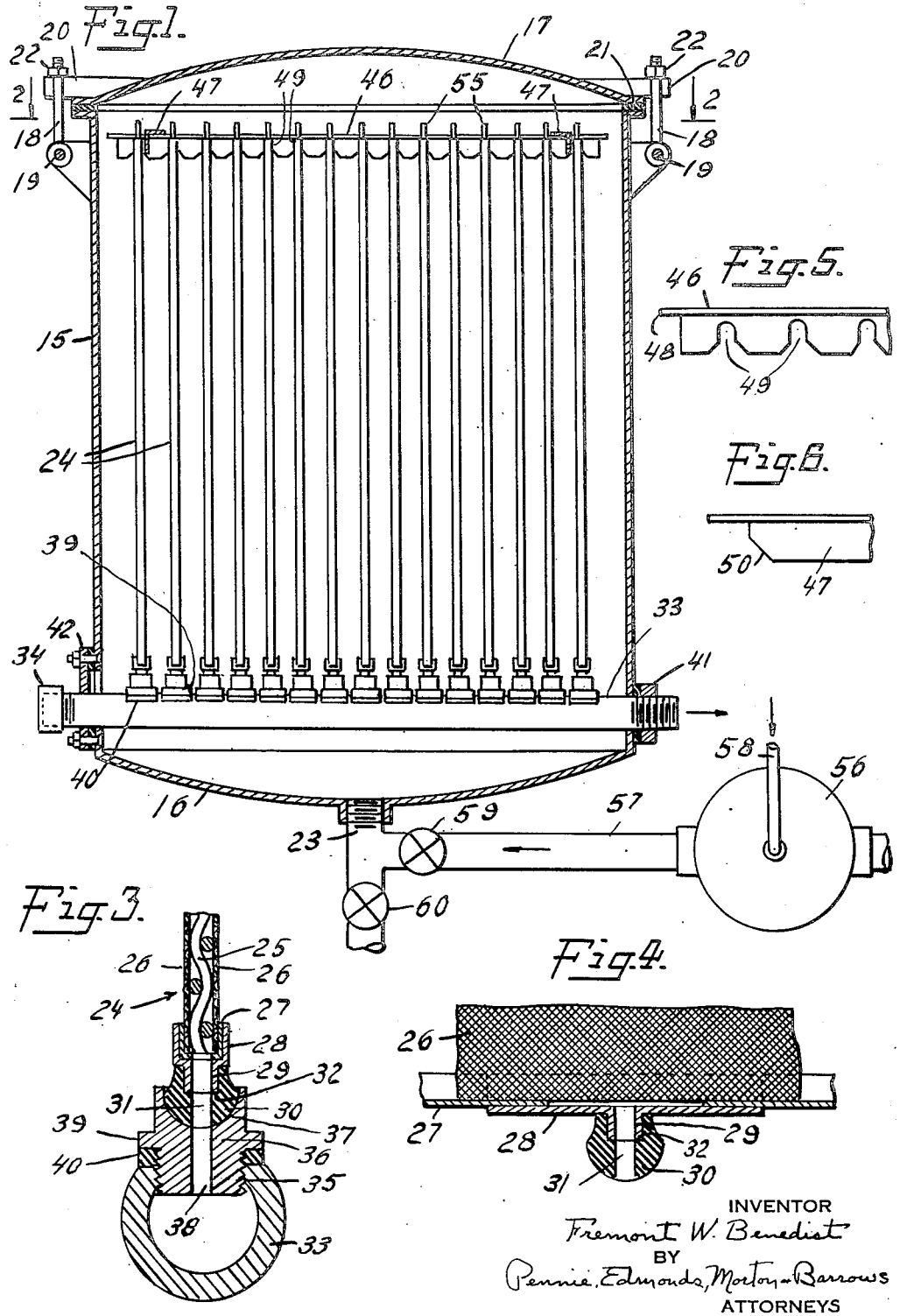
INVENTOR
Fremont W. Benedict
BY
Pennie, Edmonds, Morton & Barrows
ATTORNEYS May 8, 1951     F. W. BENEDICT     2,552,305
PRESSURE FILTER
Filed May 13, 1947     2 Sheets—Sheet 2
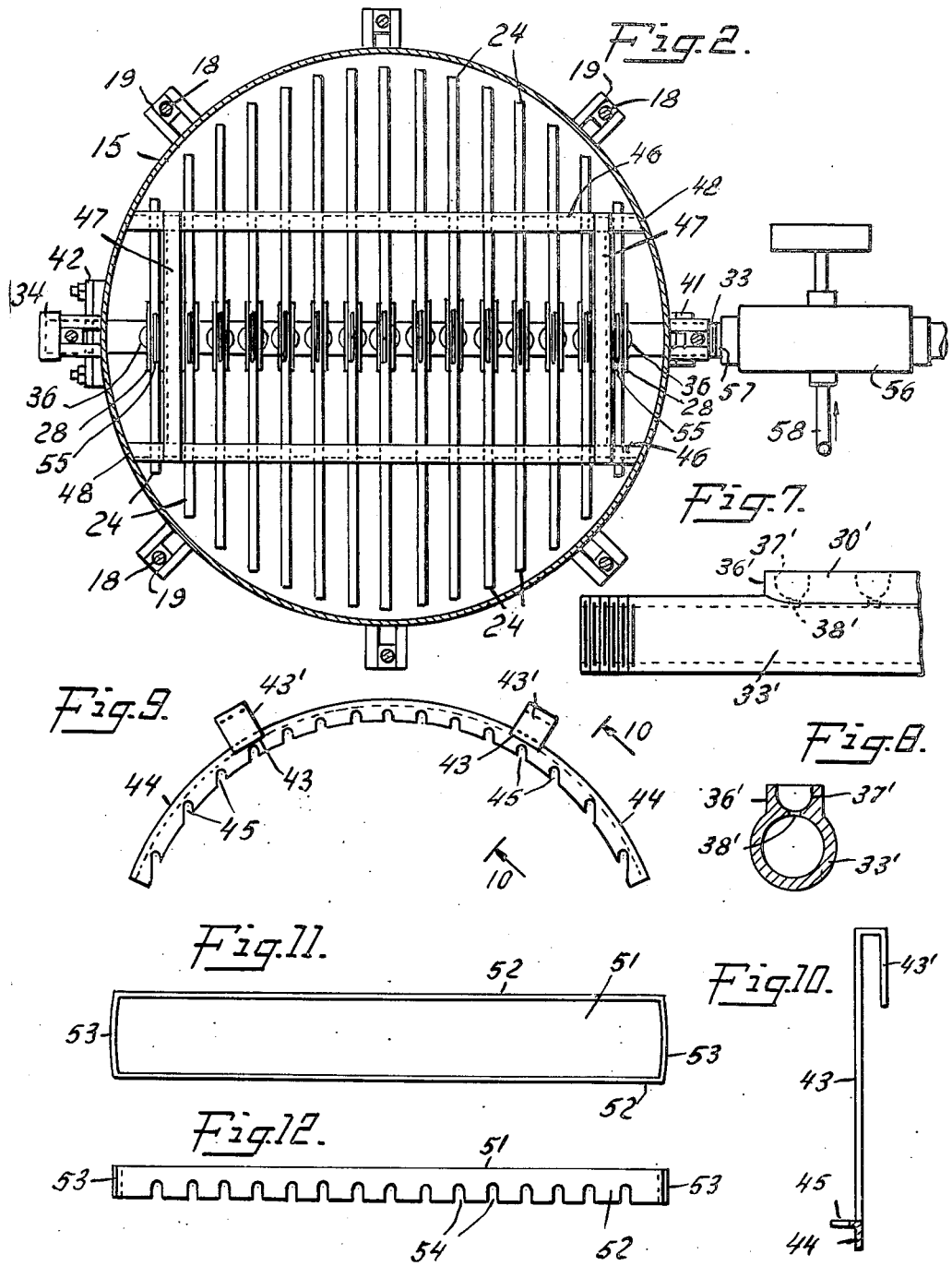
INVENTOR
Fremont W. Benedict
BY
Pennie, Edmonds, Morton, Barrows
ATTORNEYS Patented May 8, 1951

2,552,305

UNITED STATES PATENT OFFICE 2,552,305

PRESSURE FILTER

Fremont W. Benedict, Upper Darby, Pa., assignor to F. W. Benedict, Emily Benedict, E. W. Hipp, and Eve Hipp, copartners, trading under the name of Bruell Products Company, Philadelphia, Pa.

Application May 13, 1947, Serial No. 747,696

2 Claims. (Cl. 210—181)

This invention relates to pressure filters and has for its object the provision of certain improvements therein.

In pressure filters of the type to which the invention relates, the liquid to be filtered is forced under pressure against a filtering medium and the resulting filtrate is appropriately withdrawn from the filter. The filter usually comprises a closed tank for holding the liquid to be filtered under pressure and in which a plurality of filter units, usually of the leaf or plate type, are positioned in spaced relation with their filtrate-collecting interiors in communication with a filtrate manifold arranged to deliver the filtrate outside the tank. It is desirable that the filter units be removably connected to the filtrate manifold, for convenience in assembling and removal for cleaning, repair, replacement etc. However, it is difficult to provide, in a removable filter unit, a liquid-tight connection between the unit and the filtrate manifold, and unless the connection is liquid-tight, under the conditions of liquid pressure prevailing within the tank, the filtrate will be contaminated by liquid seeping or forced through the connection.

The present invention aims to provide a liquid-tight connection between a removable filter unit and the filtrate manifold in the form of a ball and socket joint. In a preferred construction, the manifold is provided with a plurality of sockets corresponding in number to the number of filter units, and a ball is operatively associated with each filter unit and is adapted to seat in a cooperating socket and to be pressed into liquid-tight contact with the socket by the weight of the filter unit. The removable filter units may advantageously be assembled within the tank by means of a temporary filter-spacing bracket adapted to be hung over the open top edge of the tank and when so hung having a part depending within the tank along one side wall. Preferably, a pair of such brackets are hung from opposite sides of the tank, and their depending parts have aligned slots in which the opposite sides of the filter unit are adapted to engage to position the units in their operative spaced relation. The filter units are held during the filtering operation in that spaced relation by a removable filter-spacing member (having slots in which the filter units engage when properly spaced by the temporary spacing brackets) in conjunction with means for holding the spacing member in engagement with the filter units when the temporary spacing brackets are removed.

The invention contemplates the incorporation in a pressure filter of one, or all or any advantageous combination of the foregoing features as well as other novel features hereinafter described, all of which will be best understood from the following description taken in conjunction with the accompanying drawings, in which Fig. 1 is an elevation, partly in section, of a pressure filter embodying the invention, Fig. 2 is a sectional top plan of the filter on the section line 2—2 of Fig. 1, Fig. 3 is a sectional detail of the connection of a filter unit to the filtrate manifold, Fig. 4 is a sectional detail of the nipple construction at the bottom of a filter unit, Fig. 5 is a side elevation of a screen spacing member, Fig. 6 is a side elevation of one form of clamping device for the spacing members, Figs. 7 and 8 are side elevation and cross-section, respectively, of a modified construction of filtrate manifold, Figs. 9 and 10 are top plan and sectional elevation on the section line 10—10 of Fig. 9, respectively, of a temporary screen spacing bracket, and Figs. 11 and 12 are top plan and side elevation, respectively, of a unitary spacing and clamping device for the filter units.

The filter comprises a tank made up of a cylindrical side wall 15 and a conical bottom 16 and is provided with a removable cover 17 adapted to be clamped to the top of the tank in pressure-tight relation therewith in any appropriate manner. In the interest of simplicity, a simple clamping means is shown in Fig. 1 comprising swinging bolts 18, pivotally mounted on circumferentially spaced brackets 19 secured to the side wall of the tank. In clamping or locking position, the bolts are swung upwardly into engagement with correspondingly spaced slotted lugs 20 on the cover and, with a resilient gasket 21 between the top of the tank and the cover, the latter is clamped to the tank by tightening nuts 22 on the bolts. The conical bottom has a centrally positioned inlet (and clean-out discharge) pipe 23.

The filtering units 24 are of the so-called plate or leaf type and may be of any suitable construction and, in operative position, are arranged vertically in horizontally spaced relation within the tank (Figs. 1 and 2). The filtering units are rectangular in shape, and of uniform height or depth, but of varying width depending upon their spacing from the center of the tank (Fig. 2). As illustrated in the drawings (Figs. 3 and 4), each filtering unit is made up of a center spacing element 25, advantageously metal mining cloth, covered on each side by a filtering medium 26, advantageously fine metal filtering cloth. A metallic edge binding member 27 is appropriately secured, by welding or otherwise, around the side edges of the unit and firmly holds the filtering media and spacing element together.

In accordance with the invention, a short length of the binding member 27 is cut out, or omitted, along the bottom of the filter unit, and the resulting open edge is closed and clamped by a binder 28 overlapping the open edge with the overlapping ends of the member 27 and binder 28 brazed or otherwise appropriately secured together. The binder 28 has a depending tubular nipple 29. The bore of the nipple is in direct communication with the interior of the filter unit, that is the interstitial space formed by the spacing element 25 between the filtering media 26 and in which filtrate collects. A resilient ball 30 is detachably secured to the nipple and has a centrally positioned bore or opening 31 permitting attachment to the nipple and the flow of filtrate through the ball.

The ball 30 may advantageously be medium soft molded rubber, although it may be of any other suitable resilient material capable of making a liquid-tight ball and socket joint with a cooperating hard surfaced socket. Its base is semi-spherical and its integral nipple-attaching end is generally conical. The diameter of the bore 31 is somewhat greater in the nipple-attaching end than in the spherical base, so that a shoulder 32 is formed against which the end of the nipple 29 seats to form a liquid-tight joint between the nipple and ball (Figs. 3 and 4).

A filtrate manifold 33 extends transversely through the tank just above the conical bottom. One end of the manifold is closed by a cap 34, and filtrate is appropriately conducted from the other open end to any desired point for storage, subsequent processing etc. In accordance with the invention the upper side of the manifold, within the tank, has a series of longitudinally spaced semi-spherical sockets corresponding in number to the number of filter units. In Figs. 1 and 2 of the drawings, the sockets are separate plugs screwed into threaded holes in the upper side of the manifold. Thus, the manifold has a series of spaced threaded holes 35 in its upper side spaced apart by a distance corresponding to the spacing of the filtering units. A plug 36 is screwed into each hole 35. The upper end of each plug 36 has a semi-spherical socket 37 with which the ball 30 of a filtering unit makes a liquid-tight ball and socket joint. Each plug has a bore 38 registering with the bore 31 of the ball and the communicating bore of the nipple 29, so that the manifold is thus in communication with the filtrate-collecting interior of each filter unit.

The plugs 36 have liquid-tight connections with the filtrate manifold. Thus, the plugs may be sweated, brazed, welded or otherwise appropriately secured to the manifold. The plug 36, as illustrated in Fig. 3, has an integral annular shoulder 39. A gasket or washer 40 is interposed between the shoulder and the manifold, surrounding the hole 35, to seal the joint between the plug and manifold. Such a liquid-tight connection of the plug to the manifold permits ready removal of the plug for inspection, repair or replacement, A modified, and preferred, form of filtrate manifold is shown in Figs. 7 and 8, where the plugs for the sockets are an integral part of the manifold. Thus, the manifold 33' is a cast pipe with an integrally cast lateral extension 36' of a length somewhat less than the diameter of the tank. Spaced semi-spherical sockets 37' are formed in the extension. A hole 38' provides communication between the bottom of each socket and the interior of the manifold. The sockets 37 and 37' are machined or otherwise suitably finished to provide smooth seats for the cooperating balls 30.

The filtrate manifold extends through opposite openings in the side wall 15 of the tank. One of these openings may be circular and of approximately the diameter of the outside diameter of the manifold. A packing nut 41 screwed on the manifold provides a satisfactory seal of the joint between this end of the manifold and the tank. The other opening in the side wall 15 must be of larger diameter or elliptical in shape to permit the manifold, with its upstanding plugs 36 (or extension 36'), to be moved therethrough when assembled in the tank and when withdrawn from the tank for replacement, repair, cleaning etc. The joint between the manifold and the tank, at this larger opening, may be made liquid-tight in any appropriate manner, as for example by a combined plate and gasket 42 bolted to the side wall of the tank.

In assembling the filter units in the tank, a pair of temporary spacing brackets are hung over the side wall 15. Each bracket has two spaced hangers 43. Each hanger has an inverted U-shaped upper end 43' adapted to slip over the top edge of the tank wall with the depending arm of the hanger in contact with the inside of the wall. A circular spacing member 44 conforming to slightly less than half the inside diameter of the tank is secured near the lower end of the spaced hangers, a suitable distance (e. g. ¼ to ⅓ of the tank height) below the top of the tank when the brackets are hung in operative position. The member 44 may advantageously be in the form of an angle iron with its vertical curved wing conforming to the inside of the tank wall. The horizontal curved wing of the member has a series of slots 45 spaced apart by the desired spacing of the filter units. The pair of spacing brackets are hung on opposite sides of the tank with the pairs of aligning slots 45 at the extremity of uniformly spaced chords parallel to a diametrical chord. Filter units of widths corresponding to the length of the chords determined by aligning pairs of slots 45 are slipped into the tank, and the ball 30 of each unit is snugly and accurately fitted into its cooperating socket 37 (or 37'). Each aligning pair of slots 45 engages the opposite sides of a filter unit and serves to guide and position the filter unit during its assembly in the tank, and until the permanent spacing member and clamping means are in position.

In Figs. 1 and 2 of the drawing, the filter units are shown spaced and clamped in their operative spaced relation by a pair of spacing members 46 and cooperating clamping devices 47. The spacing members may conveniently be made of angle iron (Figs. 1, 2 and 5). The top horizontal wing of the angle iron is adapted to lie flat on top of the filter units intermediate the center of the tank and the side wall. The ends 48 of this wing are curved to conform to the configuration of the tank. The vertical or depending wing of the angle iron has a series of slots 49 spaced apart in conformity with the spacing of the filter units by the temporary spacing brackets. The clamping devices may also be made of angle iron, with the ends of the top horizontal wing overlapping the spacing members. The vertical or depending wing of this angle iron is cut away below the overlapping ends (Fig. 6), and the ends of this wing have a beveled portion 50 which forces the curved ends 48 of the spacing members firmly against the side wall of the tank. With the spacing members 46 resting on the top of the filter unit with the top edge of each unit engaged in its cooperating slots 49, the beveled ends 50 of the clamping devices are forced down against the outer edge of the horizontal wings of the spacing members, and the spacing members are thereby securely held in position within the tank. The temporary spacing brackets may be removed as soon as the spacing members 46 have been positioned, or after the clamping devices have been positioned. The aligning pairs of slots of the temporary spacing brackets engage the opposite side edges of the filter units, while the slots of the permanent spacing member engage the top edges of the units, thus permitting free and ready withdrawal of the brackets.

A modified, and preferred, form of combined spacing member and clamping device is shown in Figs. 11 and 12 of the drawings. This device is adapted to be positioned across the top of the filter units at the middle of the tank. The device may be made of relatively heavy sheet metal (e. g. ¼ inch thick Monel metal) and has a relatively wide top portion 51, and depending side wings 52. The ends of the top 51 are curved to conform with the curvature of the tank, and the depending wings are connected, at each end, by curved end members 53 welded or otherwise appropriately secured to the side wings 52. The side wings 52 have aligned pairs of spaced slots 54 which fit over the top edges of the filter units. When pressed down over the filter units, the unitary spacing and clamping device firmly holds the units in the contemplated spaced relationship.

The filter units are usually provided with handles 55 centrally secured to the top edge. These handles do not interfere with the spacing members and clamping devices shown in Figs. 1 and 2, and may be sufficiently low in height to lie beneath the top 51 of the spacing and clamping device of Figs. 11 and 12, particularly by making the side wings 52 of adequate height for this purpose.

When the filtering units have been permanently clamped in position within the tank, the cover 17 is locked on. Liquid to be filtered is forced into the tank by a pump 56 having its outlet connected by a pipe 57 to the pipe 23 in the bottom of the tank. A filter aid, such as diatomaceous earth, activated carbon or the like, may be introduced into the suction side of the pump through a pipe 58 to maintain a porous cake on the filtering media. The pipe 57 has a valve 59 which is open during filtering and while fluid is being pumped into the tank. The pressure created within the tank by the pump forces liquid through the filtering media and clear filtrate collects within the filtering units and flows thence into the filtrate manifold and out of the tank. Solids collect on the faces of the filtering media, and when built up into a cake where filtering is no longer practical or economical, the pump is stopped, the valve 59 closed, and a valve 60 (closed during filtering) in pipe 23 is opened to permit discharge of liquid and mud in the tank.

The invention permits ready assembly and removal of the filtering units. The medium soft rubber ball of each filter unit is pressed by the weight of the unit into liquid-tight contact with its cooperating socket. The ball and socket connection is readily effected and the ball seats accurately in its socket. No liquid seeps or is forced into the filtrate manifold through the ball and socket connection. The permanent filter-spacing member and associated clamping device are readily and conveniently assembled in operative filtering position and removed to permit removal of the filtering units. This filter-spacing and clamping means holds the filter units rigid and steady during filtering and prevents consequential movement, vibration or dislodgement of the liquid-tight ball and socket connection between the units and the filtrate manifold. While the filtering units may be temporarily spaced in various other ways, the temporary spacing brackets provide a particularly advantageous way especially in conjunction with the filter-spacing and clamping means of the invention.

The improvements of the invention may be advantageously incorporated in various types of pressure filters having a plurality of spaced filter leaves, plates or the like. Such pressure filters may be used for filtering any liquid containing suspended solid matter, and may be used with particular advantage in the finishing or polishing operation on beer, where the suspended solids are of fine particle size and present in relatively low concentration. However, pressure filters equipped with the improvements of the invention are equally well adapted for rough or fore-filtering operations, where the solids are larger and present in higher concentration, such, for example, as wines, vinegar, fruit juices, sugar liquors, chemical liquors etc.

I claim:

1. In a pressure filter having a plurality of spaced filter units with filtrate-collecting interiors in communication with a filtrate manifold, the improvement which comprises a nipple depending from the bottom of each filter unit and in communication with the interior thereof, a ball removably mounted on each nipple, sockets on the manifold corresponding in number to the number of filter units and in each of which the ball attached to a filter unit is adapted to seat and make a liquid-tight connection therewith, each ball and cooperating socket having aligning bores in communication with the interior of the filter unit and with the manifold.

2. The improvement in pressure filters in which a plurality of removable filter units are arranged in spaced relation within a closed tank with their filtrate-collecting interiors in communication with a filtrate manifold positioned within the tank near its bottom, which comprises an integral lateral extension on the manifold in which a plurality of sockets are formed corresponding in number to the number of filter units, a nipple depending from the bottom of each filter unit and in communication with the interior thereof, a resilient ball removably mounted on each nipple and adapted to seat in a cooperating socket in the manifold and to be pressed into liquid-tight contact with the socket by the weight of the filter unit, a removable member having slots in which the filter units engage to position the units in their operative spaced relation, and means operatively connected with said member for firmly holding it in engagement with the filter units.

FREMONT W. BENEDICT.

REFERENCES CITED

The following references are of record in the file of this patent:

UNITED STATES PATENTS

| Number | Name | Date |
|---|---|---|
| 482,922 | Herman | Sept. 20, 1892 |
| 1,099,212 | Springer | June 9, 1914 |
| 1,919,448 | Norquist et al. | July 25, 1933 |
| 2,013,776 | Weisman | Sept. 10, 1935 |
| 2,093,894 | Mojonnier | Sept. 21, 1937 |
| 2,332,893 | Clickner | Oct. 26, 1943 |
| 2,342,035 | Clark | Feb. 15, 1944 |
| 2,434,807 | Little | Jan. 20, 1948 |